United States Patent [19]

Inoue et al.

[11] 4,101,944

[45] Jul. 18, 1978

[54] MAGAZINE LOADING DEVICE FOR MAGNETIC VIDEO RECORDING AND REPRODUCING APPARATUS

[76] Inventors: Makoto Inoue; Toshiki Ikeda; Koichiro Abe, all c/o Teac Video Corporation, 7-3, Nakacho 3-chome, Musashino-shi, Tokyo, Japan

[21] Appl. No.: 824,164

[22] Filed: Aug. 12, 1977

Related U.S. Application Data

[63] Continuation of Ser. No. 688,592, May 21, 1976, abandoned, which is a continuation of Ser. No. 525,754, Nov. 21, 1974, abandoned.

[30] Foreign Application Priority Data

Nov. 24, 1973 [JP] Japan .................................. 48-132392

[51] Int. Cl.$^2$ ...................... G11B 15/66; G11B 23/04; G11B 5/52
[52] U.S. Cl. ........................................ 360/85; 360/95
[58] Field of Search .................... 360/132, 85, 92, 96, 360/95; 226/91, 11, 12; 242/194

[56] References Cited

U.S. PATENT DOCUMENTS

| | | | |
|---|---|---|---|
| 3,669,457 | 6/1972 | Nozawa et al. | 360/93 |
| 3,702,907 | 11/1972 | Sato | 360/132 |
| 3,729,202 | 4/1973 | Wakabayashi | 360/96 |
| 3,740,495 | 6/1973 | Kihara | 360/85 |
| 3,860,964 | 1/1975 | Kuzu et al. | 360/92 |
| 3,877,075 | 4/1975 | Watanbe | 360/96 |

*Primary Examiner*—Alfred H. Eddleman
*Attorney, Agent, or Firm*—Marshall & Yeasting

[57] ABSTRACT

A magnetic video recording and reproducing apparatus is disclosed which is provided with a magazine loading section disposed on the main surface of a main chassis of the apparatus, a rotary magnetic head assembly composed of a cylindrical magnetic tape guide surface and a rotary magnetic head and disposed on the main surface of the main chassis, a magazine loading device for loading a magazine formed with a casing containing a magnetic tape onto the magazine loading section and unloading the magazine therefrom, and magnetic tape threading means for drawing out the magnetic tape from the magazine loaded on the magazine loading section to thread it on the magnetic tape guide surface of the rotary magnetic head assembly.

4 Claims, 12 Drawing Figures

MAGAZINE LOADING DEVICE FOR MAGNETIC VIDEO RECORDING AND REPRODUCING APPARATUS

This is a continuation of application Ser. No. 688,592, filed May 21, 1976, now abandoned, which is a continuation of Application Ser. No. 525,754 filed Nov. 21, 1974, now abandoned.

BACKGROUND OF THE INVENTION

1. Field of the Invention

This invention relates to a magnetic video recording and reproducing apparatus employing a magazine having housed therein a magnetic tape, and more particularly to a magnetic video recording and reproducing apparatus which is provided with a magazine loading section disposed on the main surface of a main chassis of the apparatus, a rotary magnetic head assembly composed of a cylindrical magnetic tape guide surface and a rotary magnetic head and disposed on the main surface of the main chassis, a magazine loading device for loading a magazine formed with a casing containing a magnetic tape onto the magazine loading section and unloading the magazine therefrom, and magnetic tape threading means for drawing out the magnetic tape from the magazine loaded on the magazine loading section to thread it on the magnetic tape guide surface of the rotary magnetic head assembly.

2. Description of the Prior Art

A magazine loading device for use in such a magnetic video recording and reproducing apparatus is usually provided with a magazine holder for housing the magazine inserted thereinto from the front of the magazine holder, a magazine holder support mechanism for supporting the magazine holder and bringing it from a magazine housing and unhousing position to a magazine loading position and bringing the magazine holder back to the magazine mounting and demounting position, a spring mechanism interposed between the magazine holder support mechanism and the magazine holder for biasing the magazine holder towards the magazine housing and unhousing position, and a locking mechanism for locking the magazine holder at the magazine loading position when the magazine holder is brought by the magazine holder support mechanism onto the magazine loading section against the biasing force of the spring mechanism and releasing the magazine holder from the locked position.

With such a magazine loading device, there is the possibility that if a magazine housed in a magazine holder upside down or with the front side back is brought as it is to the magazine loading section, the magazine loading section is damaged by the magazine. To avoid this, a variety of erroneous housing preventive mechanisms haveheretofore been proposed. However, such conventional mechanisms are complicated in construction.

In the magazine loading device, the magazine is not smoothly loaded on the magazine loading section unless it is housed correctly in the magazine holder at a predetermined position. To ensure correct positioning of the magazine in the magazine holder, various means have been proposed in the past but they are also complicated in construction.

Further, when the magazine housed in the magazine holder is brought to the magazine loading section, if reels having wound thereon a magnetic tape contained in the magazine and reels supports of the magazine loading section are not suitably coupled with each other, the magnetic tape cannot be smoothly guided and transported along the magnetic tape guide surface of the rotary magnetic head assembly. In the conventional magazine loading device, coupling between the reel and the reel supports is not fully satisfactory.

In the conventional magazine loading device, its spring mechanism is complicated in construction and when the magazine holder is released from its locked position, the magazine holder does not stably return to the magazine housing and unhousing position.

Moreover, if the magazine holder is not supported by the magazine holder support mechanism in a manner to be its balanced state while it is brought by the magazine holder support mechanism from the magazine housing and unhousing position to the magazine loading position, the magazine cannot be smoothly loaded on the magazine loading section. Therefore, means for maintaining the magazine in its balanced state have been provided in the conventional magazine loading device but they are complicated in construction.

Further, in the magazine loading device, if the magazine incompletely housed in the magazine holder is brought to the magazine loading section, the magazine loading section is likely to be damaged by the magazine. To avoid this, various means have heretofore been proposed, but they are complicated in construction.

Furthermore, in the conventional magazine loading device, when the magazine holder is released from its locked position on the magazine loading section and returned by the biasing force of the spring mechanism to the magazine housing and unhousing position, a great mechanical shock is produced.

SUMMARY OF THE INVENTION

One object of this invention is to provide a magnetic video recording and reproducing apparatus which is provided with a magazine loading section disposed on the main surface of a main chassis of the apparatus, a rotary magnetic head assembly composed of a cylindrical magnetic tape guide surface and a rotary magnetic head and disposed on the main surface of the main chassis, a magazine loading device for loading a magazine formed with a casing containing a magnetic tape onto the magazine loading section and unloading the magazine therefrom, and magnetic tape threading means for drawing out the magnetic tape from the magazine loaded on the magazine loading section to thread it on the magnetic tape guide surface of the rotary magnetic head assembly and in which the magazine loading device is composed of at least a magazine holder for housing the magazine inserted thereinto from the front of the magazine holder and a magazine holder support mechanism for supporting the magazine holder and bringing it from a magazine housing and unhousing position to a magazine loading position and bringing the magazine holder back to the magazine housing and unhousing position, and more particularly to provide such a magnetic video recording and reproducing apparatus in which the magazine loading device further includes an erroneous housing preventive mechanism for preventing the magazine from being housed in the magazine holder upside down or with the front side back and the erroneous housing preventing mechanism is simpler in construction than conventional types of such mechanisms.

Another object of this invention is to provide a magnetic video tape recording and reproducing apparatus of the above construction and in which the magazine loading device further includes a magazine pressing mechanism for ensuring the magazine in the magazine holder correctly at a predetermined position and the magazine pressing mechanism is simpler in construction than conventional types of such means.

Another object of this invention is to provide a magnetic video recording and reproducing apparatus of the above construction and in which the magazine loading device further includes a reel pressing mechanism for providing suitable coupling between reels having wound thereon the magnetic tape contained in the magazine and reel supports of the magazine loading section and the reel pressing mechanism is more excellent than conventional types of such means.

Another object of this invention is to provide a magnetic video recording and reproducing apparatus of the above construction and in which the magazine loading device further includes a balancing mechanism for balancing the magazine holder while the magazine holder is brought by the magazine holder support mechanism from the magazine housing and unhousing position to the magazine loading position and the balancing mechanism is simpler in construction than conventional types of such means.

Another object of this invention is to provide a magnetic video recording and reproducing apparatus of the above construction and in which the magazine loading device further includes a magazine loading limiting mechanism for preventing the magazine holder from being brought to the magazine loading section when the magazine is not completely housed in the magazine holder and the magazine loading limiting mechanism is simpler in construction than conventional types of such means.

Another object of this invention is to provide a magnetic video recording and reproducing apparatus which is provided with a magazine loading section disposed on the main surface of a main chassis of the apparatus, a rotary magnetic head assembly composed of a cylindrical magnetic tape guide surface and a rotary magnetic head and disposed on the main surface of the main chassis, a magazine loading device for loading a magazine formed with a casing containing a magnetic tape onto the magazine loading section and unloading the magazine therefrom, and magnetic tape threading means for drawing out the magnetic tape from the magazine loaded on the magazine loading section to thread it on the magnetic tape guide surface of the rotary magnetic head assembly and in which the magazine loading device is composed of at least a magazine holder for housing the magazine inserted thereinto from the front of the magazine holder, a magazine holder support mechanism for supporting the magazine holder and bringing it from a magazine housing and unhousing position to a magazine loading position and bringing the magazine holder back to the magazine housing and unhousing position, a spring mechanism interposed between the magazine holder support mechanism and the magazine holder for biasing the magazine holder towards the magazine housing and unhousing position, and a locking mechanism for locking the magazine holder at the magazine loading position when the magazine holder is brought by the magazine holder support mechanism onto the magazine loading section against the biasing force of the spring mechanism and releasing the magazine holder from the locked position, and more particularly to provide such a magnetic video recording and reproducing apparatus in which the spring mechanism is simpler in construction than conventional types of such means and the magazine holder can be stably returned to the magazine housing and unhousing position when it is released from its locked position.

Still another object of this invention is to provide a magnetic video recording and reproducing apparatus of the above construction and in which the magazine loading device further includes a buffer mechanism for preventing a great mechanical shock when the magazine holder is released from its locked position and returned by the biasing force of the spring mechanism to the magazine housing and unhousing position and the buffer mechanism is simpler in construction than conventional types of such means.

Other objects, features and advantages of this invention will become apparent from the following description taken in conjunction with the accompanying drawings.

DESCRIPTION OF THE PREFERRED EMBODIMENTS

With reference to the drawings, one example of this invention will hereinafter be described.

Figure 1:
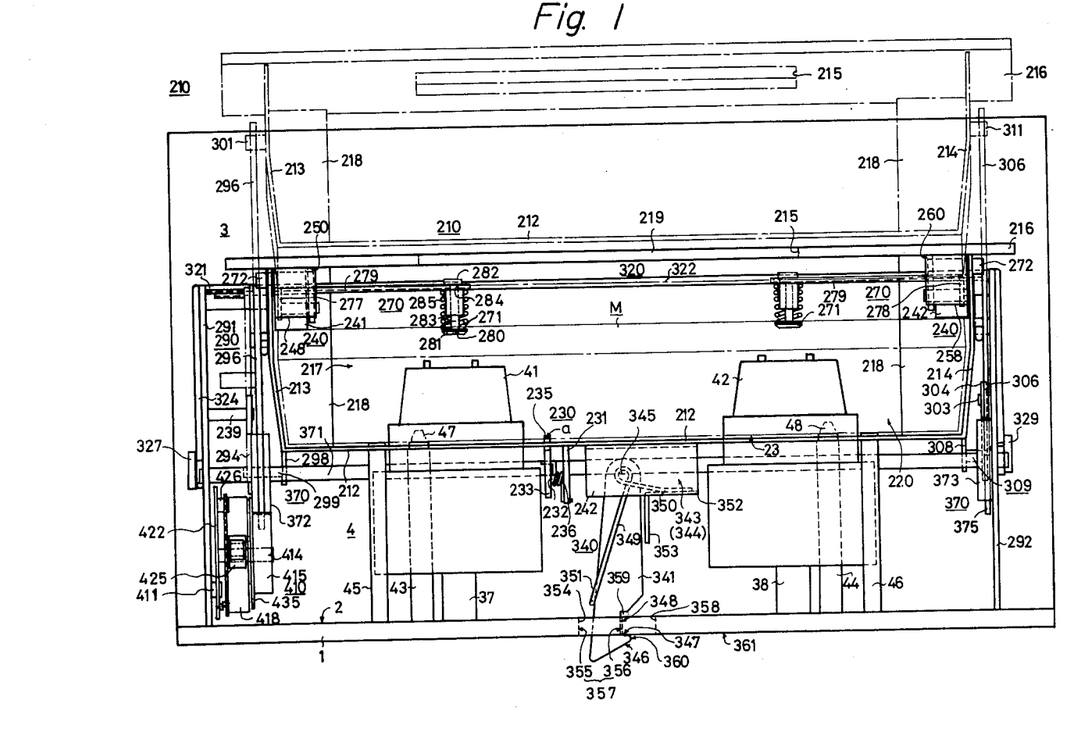
FIG. 1 is a front view showing one example of a magazine loading device for a magnetic video recording and reproducing apparatus according to this invention.
Figure 3:
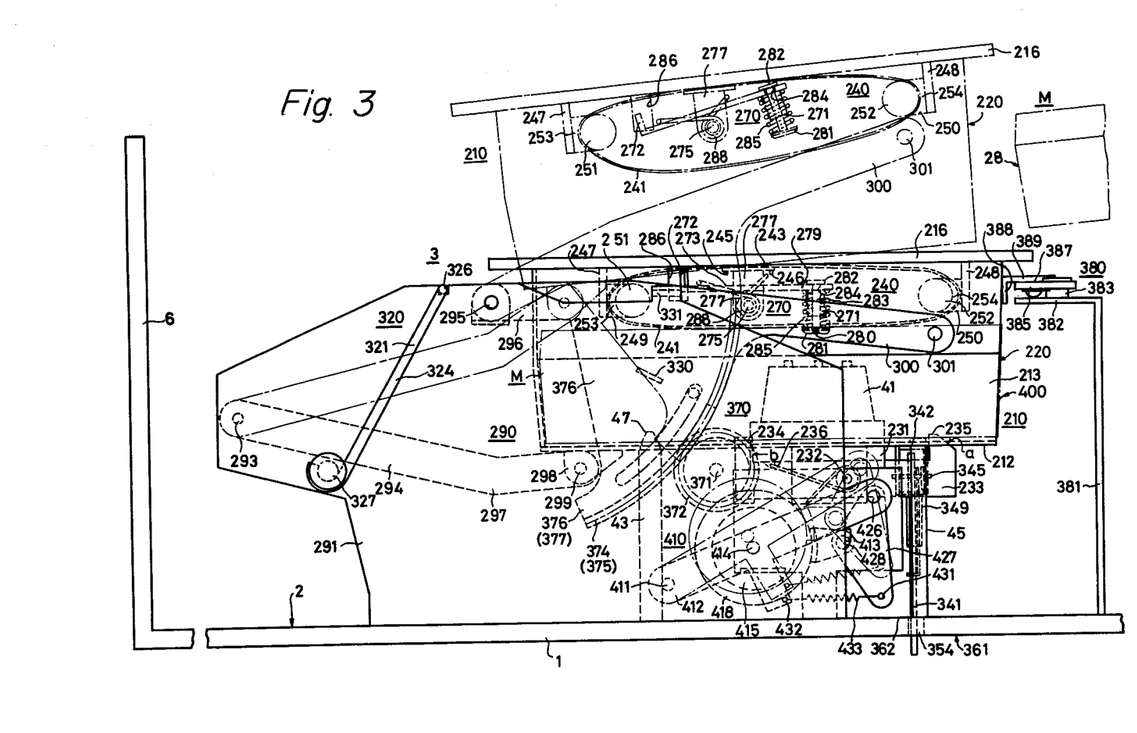
FIG. 3 is a side view of the device shown in FIG. 1.
Figure 4A:
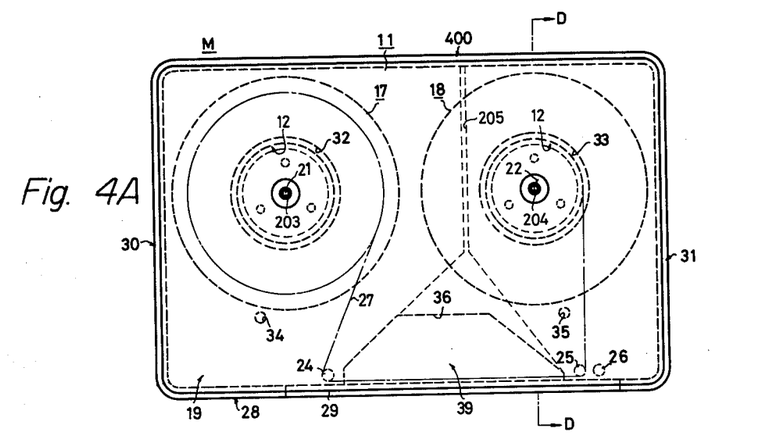
FIG. 4A is a plan view illustrating one example of a magazine for use in this invention.
Figure 4B:
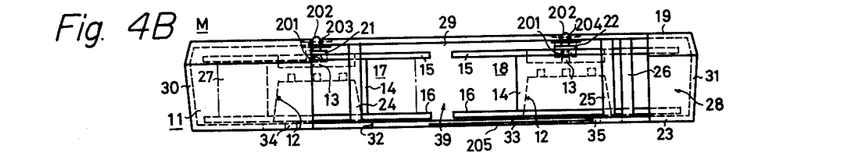
FIG. 4B is a front view of the magazine shown in FIG. 4A.
Figure 4C:
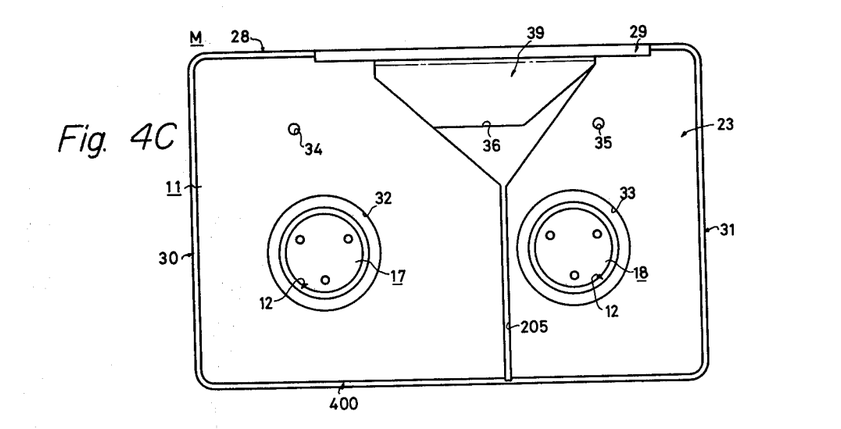
FIG. 4C is a bottom view of the magazine shown in FIG. 4A.
Figure 4D:
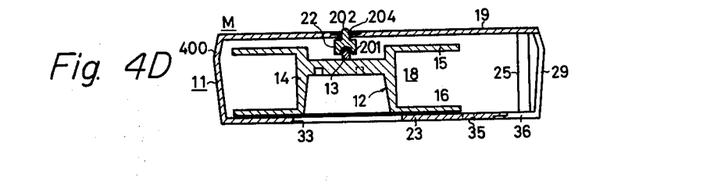
FIG. 4D is a cross-sectional view taken on the line D—D in FIG. 4A.

In FIGS. 1 to 3, reference numeral 1 indicates a main chassis. On the forward portion of its main surface 2 is provided a magazine loading section 4 on which a magazine M is loaded by a magazine loading device 3. On the backward portion of the main surface 2 are mounted a rotary magnetic head assembly 60, first and second position defining means 70 ard 80, magnetic tape threading means 81 and magnetic tape drive means 82. The main chassis 1 has a rear panel 6 extending up from its rear edge perpendicularly to the main surface 2.

One example of the magazine M which is loaded on the magazine loading section 4 has such a construction as shown in FIGS. 4A, 4B, 4C and 4D, in which supply nd tape-up reels 17 and 18 are disposed in a rotatable manner in a casing 11 at left and right positions. The supply and take-up reels 17 and 18 are each composed of a bobbin 14 having formed therein a reel support receiving hole 12 on the side of a bottom plate 23 of the casing 11 and a pair of opposed flanges 15 and 16 extending outwardly from the upper and lower peripheral edges of the bobbin 14 in its radial direction. In this case, central shafts 13 of the reels 17 and 18 are pivoted to bearings 21 and 22 provided on an upper plate 19 of the casing 11, respectively. Each of the bearings 21 and 22 is a pin-shaped member which has, in its lower end face, a cavity 201 for receiving the central shaft 13 of each reel and, in its upper end face, an engaging face 202 for engagement with a reel pressing member 271 of a reel pressing mechanism 270 described later on. The bearings 21 and 22 are loosely inserted into apertures 203 and 204 formed in the top plate 19 in a manner to be movable up and down, with their cavities 201 disposed in the casing 11 and their engaging faces 202 projecting out of the top plate 19.

The casing 11 has planted therein at the left-hand position near its front a tape guide pin 24 extending between the top and bottom plates 19 and 23. Further, the casing 11 has planted therein at the right-hand position near the front a pair of tape guide pins 25 and 26 (with the pin 25 on the left-hand side) in adjacent but laterally spaced relation to each other which similarly extend between the top and bottom plates 19 and 23. A front plate 28 of the casing 11 has formed therein a magnetic tape outlet window 29 laterally extending from the left-hand side of the tape guide pin 24 to the right-hand side of the tape guide pin 26. The bottom plate 23 of the casing 11 has formed therein, at positions corresponding to the reel support receiving holes 12 of the reels 17 and 18, reel support insertion holes 32 and 33 through which the reel support receiving holes are exposed to the outside, respectively, and positioning holes 34 and 35 a little spaced away from the holes 32 and 33 on the side of the front of the casing 11. Further, the bottom plate 23 has formed therein a recess 36 extending rearwardly from its front edge to communicate with the aforesaid window 29 from the right-hand side of the tape guide pin 24 to the left-hand side of the tape guide pin 25, and a narrow groove 205 communicating with the recess 36 and extending rearwardly therefrom. In this case, the groove 205 is positioned further to, for example, right, than the center of the bottom plate 23 in its lateral direction.

The casing 11 of such a magazine M has housed therein a magnetic tape 27 which is drawn out from the reel 17, threaded across the tape guide pin 24, thence between the tape guide pins 25 and 26 and thence across the tape guide pin 25 and wound on the reel 18. Accordingly, the magnetic tape 27 is exposed to the outside through the window 29 and, behind the magnetic tape 27, there is formed a space 39 which is accessible from the outside through the recess 36 formed in the bottom plate 23 of the casing 11. A rear plate 400 of the magazine M is slightly inclined forwardly as its lower end is approached.

The magazine loading section 4 is composed of supply and take-up reel shafts 37 and 38 corresponding to the reels support receiving holes 12 of the reels 18 and 17 of the magazine M described above, which are pivotally mounted (by suitable means, though not shown) on the main surface 2 of the main chassis 1 perpendicularly thereto at left - and right-hand position on its forward position; reel supports 41 and 42 mounted on the reel shafts 37 and 38, respectively; magazine supports 43 and 44 of the same height and corresponding to the aforesaid magazine positioning holes 34 and 35, which are planted on the main surface 2 perpendicularly thereto on the left and right of the reel supports 41 and 42 a little behind them, respectively, and support at their free end faces the bottom plate 23 of the magazine M; magazine supports 45 and 46 of the same height as the above magazine supports 43 and 44, which are planted on the main surface 2 perpendicularly thereto on the left and right of the reel supports 41 and 42 a little before them, respectively, and similarly support at their end faces the bottom plate 23 of the magazine M; and magazine positioning pins 47 and 48 planted on the free end faces of the reel supports 43 and 44, respectively.

The magazine M, contained in a magazine holder 210, is loaded by a magazine support mechanism 290 of the magazine loading device 3 described later on the above magazine loading section 4 from about, with the front plate 28 on the rear side of the magazine loading section 4 and the bottom plate 23 resting on the magazine supports 43 to 46 of the loading section 4, as indicated by chain lines in FIGS. 1 to 3. In this case, since the magazine supports 43 to 46 are of the same height from the main surface 2 of the main chassis 1, the height of the magazine M from the main surface 2 is defined with its top and bottom surfaces held in parallel with the main surface 2. Further, since the pins 47 and 48 are inserted into the holes 35 and 34 of the magazine M, the position of the magazine M in the horizontal direction is defined. Moreover, since the reel supports 41 and 42 are inserted into the holes 12 of the reels 18 and 17 of the magazine M respectively, the magnetic tape 27 in the magazine M is transported from the reel 17 to the reel 18 or vice versa by driving the reel shafts 37 and 38 with a reel shaft driving mechanism provided under the chassis 1, though not shown.

The rotary magnetic head assembly 60 is disclosed in our co-pending application filed previously claiming priority of Japanese Patent Application No. 129378/1973 dated Nov. 17, 1973, and hence will not be described in detail. As indicated by chain lines in FIG. 2, the rotary magnetic head assembly 60 has cylindrical members 62 and 63 which are concentrically placed one on the other to provide a magnetic tape guide surface 67, and the upper cylindrical member 63 is rotated by a rotary shaft 64 affixed thereto. A rotary magnetic head (not shown) is mounted on the lower peripheral edge of the cylindrical member 63 in a manner to slightly project out from the magnetic tape guide surface 67.

Further, the first and second position defining means 70 and 80 have two position defining pins 74 and 75, 86 and 87, respectively. The pin 74 is positioned, for example, adjacent to the center of the front of the magnetic tape guide surface 67 of the rotary magnetic head assembly 60; the pin 75 is positioned on the right of the pin 74 a little forwardly thereof; the pin 86 is positioned adjacent to the right-hand part of the tape guide surface 67 a little rearwardly thereof; and the pin 87 is positioned on the right of the pin 86 forwardly thereof.

The magnetic tape threading means 81 has a rotary ring 93 disposed around the rotary magnetic head assembly 60 to rotate between first and second rotational positions and a plurality of magnetic tape guide mechanisms 111-1 to 111-3 disposed along the rotary ring 93. In this case, the rotary ring 93 has mounted thereon a magnetic tape drawing-out and guide pin 106 and a pinch roller 98 which are brought through the recess 36 into the space 39 behind the magnetic tape 27 in the casing 11 of the magazine M loaded on the magazine loading section 4 when the rotary ring 93 is in its first rotational position. With the rotational movement of the rotary ring 93 from its first rotational position to the second one, the magnetic tape 27 is drawn out by the tape drawing-out and guide pin 106 through the window 29 of the casing 11 from the magazine M loaded on the magazine loading section 4 and is threaded on the tape guide surface 67 of the rotary magnetic head assembly 60, passing across the position defining means 70 and 80 and the tape guide mechanisms 111-1 to 111-3.

Figure 2:
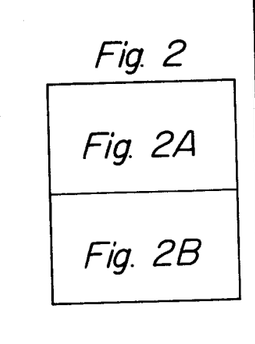
FIG. 2 is a view showing the arrangement of FIGS. 2A and 2B.
Figure 2A:
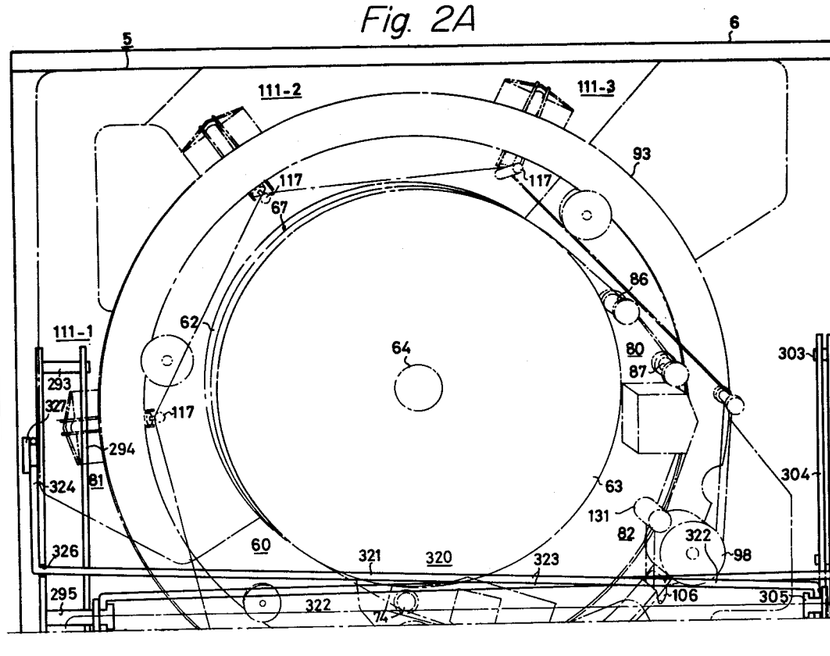
FIGS. 2A and 2B are plan views of the device depected in FIG. 1.
Figure 2B:
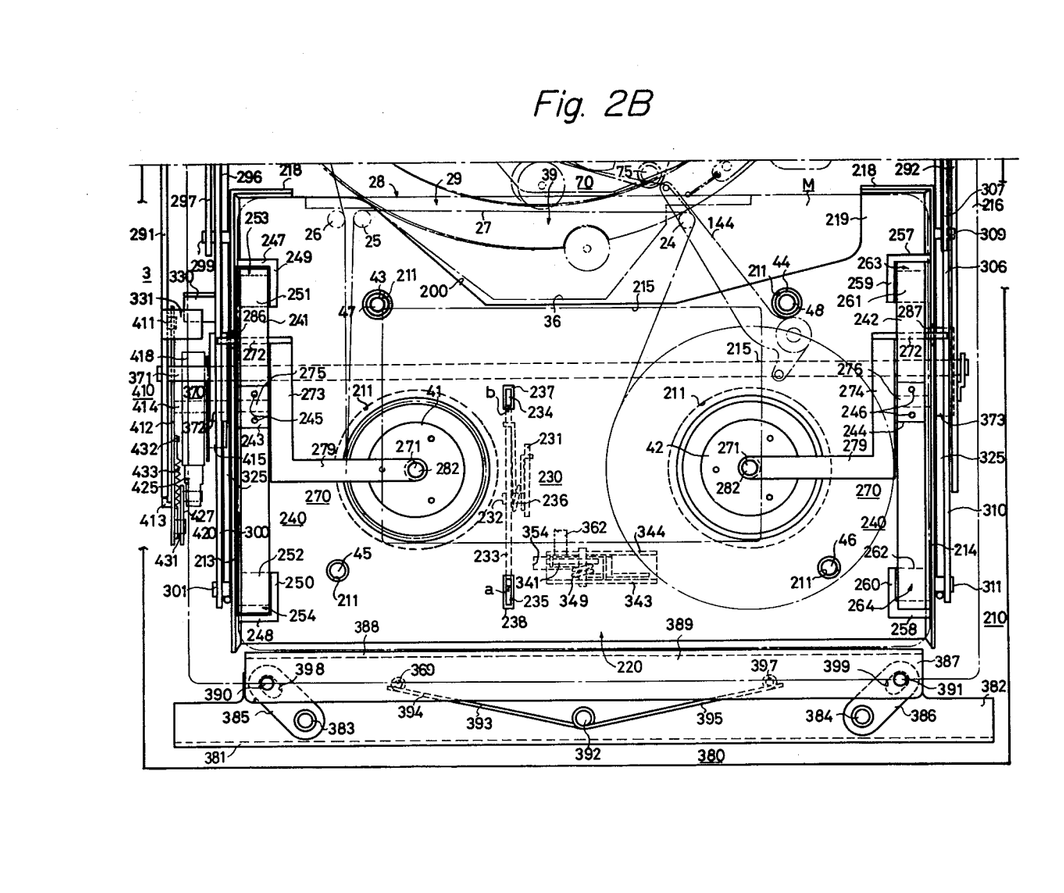

The magnetic tape drive means 82 includes a capstan 131 with which the pinch roller 98 makes rotary contact, with the magnetic tape 27 being gripped therebetween, when the rotary ring 93 is in its second rotational position. Accordingly, at the second rotational position of the rotary ring 93, the magnetic tape 27 is driven by the tape drive means 82 while being guided by the tape guide surface 67 of the rotary magnetic head assembly 60, by which a video signal is recorded on the magnetic tape 27 in the form of skew magnetic tracks thereacross at a predetermined angle to its lengthwise direction reproduced therefrom. The magnetic tape guide mechanisms 111-1 to 111-3 each include a magnetic tape guide pin 117 by which that outer part of a loop formed by the magnetic tape 27 drawn out by the tape drawing-out and guide pin 106 from the magazine M which is on the opposite side from the inner part of the tape loop on the side of the tape guide surface 67 of the rotary magnetic head 60 is kept apart from the inner part of the loop when the rotary ring 93 is in its second rotational position. In FIG. 2, reference numeral 144 indicates a tension arm, by which the magnetic tape 27 is held at substantially constant tension while being transported across the pins 74 and 75.

The magnetic loading device 3, by which the magazine M is loaded on the magazine loading section 4 for recording a video signal on the magnetic tape 27 of the magazine M or reproducing the recorded signal from the tape by the rotary magnetic head assembly 60 or unloaded from the loading section 4, has the following construction.

Namely, the magazine loading device 3 has the magazine holder 210 for housing the magazine M.

The magazine holder 210 is formed with a casing 219 which has a bottom plate 212 having formed therein a through hole 211 large enough to permit the insertion therethrough of the reel supports 41 and 42 and the magazine supports 43 to 46 of the magazine loading section 4 and a recess 200 extending forwardly from the rear edge for guiding the tape drawing-out and guide pin 106 and the pinch roller 98 of the tape threading means 81; left and right opposed side plates 213 and 214 spaced apart substantially the same distance as that between the outer surfaces of the left and right side plates 30 and 31 of the magazine M; a top plate 216 having formed therein a peep window 215; and a rear plate 218 having formed therein a tape outlet window 217 communicating with the recess 200 of the bottom plate 212. The open front defined by the bottom plate 212, the left and right side plates 213 and 214 and the top plate 216 is used as a magazine insertion window 220, through which the magazine M is inserted into the casing 219 with the front plate 28 directed towards the rear plate 218 of the casing 219.

The magazine holder 210 has an erroneous housing preventive mechanism 230 which prevents the magazine M from being housed in the holder 210 unless the magazine M is inserted into the casing 219 with the bottom plate 23 down and the front plate 28 directed towards the rear plate 218 of the casing 219.

This mechanism 230 has a support plate 231 extending down from the bottom plate 212 of the casing 219, and a rotative lever 233 is pivoted by a pin 232 to the support plate 231. The rotative layer 233 has a pair of opposed pawls 234 and 235 extending upwardly from its both ends and a coiled spring 236 is interposed between the rotative lever 233 and the support plate 231. In this case, the bottom plate 212 of the casing 219 has formed therein through-holes 237 and 238 at positions corresponding to the front and rear positions of the aforesaid groove 205 formed in the bottom plate 23 of the magazine M housed in the casing 219 with the bottom plate 23 rested on the bottom plate 212 of the casing 219 and with the front plate 28 facing towards the rear plate 218 of the casing 219. When the magazine M housed in the casing 219 as described above, the pawl 235 of the rotative lever 233 is loosely inserted into the groove 205 of the bottom plate 23 of the magazine M through the through hole 238 and the other pawl 234 is loosely inserted into the groove 205 in the same manner as the pawl 235. On the other hand, the upper front end of the pawl 235 of the rotative lever 233 has a forwardly inclined face $a$ and the upper front end of the pawl 234 has an upwardly extending face $b$.

Further, the magazine holder 210 has a magazine pressing mechanism 240 by which the magazine M placed in its predetermined position in the casing 219 is pressed against the bottom plate 212, thereby to prevent the magazine M from trembling in the casing 219.

The mechanism 240 has a pair of resilient rings 241 and 242, each formed by bending a resilient belt in the form of a ring. The resilient rings 241 and 242 are secured by plates 243 and 244 and screws 245 and 246 to the top plate 216 of the magazine holder 210 on the inside thereof adjacent to its left and right side plates 213 and 214, with the axes of the rings 241 and 242 perpendicular to the side plates 213 and 214 of the magazine holder 210. In this case, the resilient rings 241 and 242 are sandwiched at one place between the top plate 216 of the magazine holder 210 and the plates 243 and 244, respectively, as shown, and the position of the top plate 216 to which each of the rings 241 and 242 is secured at one place is substantially at the center of the top plate 216 in its widthwise direction. On the inside of the left side plate 213, there are mounted at rear and front positions on the side of the top plate 216 limiting plates 247 and 248 extending right-wards in a plane perpendicular to the top plate 216. To the free ends of the limiting plates 247 and 248, support plates 249 and 250 are secured which extend forwardly and backwardly of the free ends in parallel with the left side plate 213, respectively. The support plates 249 and 250 have mounted thereon cylindrical members 251 and 252, respectively, with small gaps 253 and 254 defined between their peripheries and the limiting plates 247 and 248 so that the rear and front portions of the resilient ring 241 may be loosely inserted into the gaps 253 and 254, respectively. Limiting plates 257 and 258 similar to the aforesaid limiting plates 247 and 248 are mounted on the inside of the right side plate 214 at rear and front positions on the side of the top plate 216, and support plates 259 and 260 similar to the aforementioned plates 249 and 250 are secured to the free ends of the limiting plates 257 and 258. The support plates 259 and 260 have mounted thereon cylindrical members 261 and 262, respectively, with gaps 263 and 264 defined between their peripheries and the limiting plates 257 and 258 so that the rear and front portions of the resilient ring 242 may be loosely inserted into the gaps 263 and 264, respectively. Moreover, the magazine holder 210 has a reel pressing mechanism 270 by which when the magazine M is housed at its predetermined position in the casing 219, the reels 17 and 18 mounted in the casing 11 of the magazine M are urged against the bottom plate 23 of the casing 11 to ensure that the reels 17 and 18 may be positioned on the magazine loading section 4 when the magazine M is loaded at its predetermined position in the magazine loading section 4.

The mechanism 270 has a pair of rotative levers 273 and 274, each carrying at one free end a reel pressing member 271 and at the other free end an engaging member 272. The rotative levers 273 and 274 are mounted by shafts 275 and 276 on posts 277 and 278 respectively formed integrally with the plates 243 and 244 of the magazine pressing mechanism 240 in such a manner as to be rotatable in planes parallel with the planes of the left and right side plates 213 and 214, respectively. In this case, the reel pressing member 271 mounted on the rotative lever 273 is provided at the free end of an arm 279 of the rotative lever 273 extending to the right adjacent to the inside of the top plate 216 of the magazine holder 210 in a direction substantially perpendicular to the plane of rotation of the rotary lever 273. This reel pressing member 271 has a pin 283 the one free end of which has mounted thereon a shaft receiving piece 281 having a concave surface 280 in its underside for receiving the engaging surface 282 of the bearing 22 projecting out onto the top plate 19 of the casing 11 through the central aperture 204 formed in the top plate 19, and the other free end of which has mounted thereon a flange 282. The pin 283 is loosely inserted into a through hole 284 previously formed in the free end portion of the arm 279 in such a manner that the pin 283 extends in a direction perpendicular to the direction of extension of the arm 279. A coiled spring 285 is interposed between the shaft receiving piece 281 and the underside of the free end of the arm 279, by which the shaft receiving piece 281 is biased in such a direction that the flange 282 is urged against the upper surface of the arm 279. The engaging member 272 of the rotative lever 273 extends to the left in a direction substantially perpendicular to the plane of rotation of the rotative lever 273 and projects out of the left side plate 213 of the magazine holder 210 through a vertically elongated hole 286 formed therein so that the engaging member 272 may engage a support arm 298 from (hereinafter will be discribed) from above. The reel pressing member 271 of the rotative lever 274 is identical in construction with the reel pressing member 271 of the rotative lever 273 described above, so that corresponding parts are identified by the same reference numerals and no detailed description will be repeated. The arm 279 of the rotative lever 274 extends to the left adjacent the inside of the top plate 216 of the magazine holder 210 in the direction substantially perpendicular to the plane of rotation of the rotative lever 274. The engaging member 272 of the rotative lever 274 extends to the right in the direction substantially perpendicular to the plane of rotation of the rotary lever 274 and projects out of the right side plate 214 of the magazine holder 210 through a vertically elongated hole 287 formed therein so that the engaging member 272 may engage a support arm 306 (hereinafter will be discribed) from above.

The rotative levers 273 and 274 of the reel pressing mechanism 270 are biased clockwise in FIG. 3 by coiled springs 288 and 289 respectively wound on shafts 275 and 276 so that the free ends of the engaging members 272 may be urged against the bottoms of the elongated holes 286 and 287, respectively.

Further, the magazine loading device 3 includes a magazine holder support mechanism 290 by which the magazine holder 210 is brought to a magazine housing and unhousing position where the magazine M is inserted in or removed from the magazine holder 210, and a magazine loading position where the magazine M is loaded on the magazine loading section 4 at the predetermined position.

The support mechanism 290 has parallel and opposed left and right support plates 291 and 292 extending on both sides of the magazine loading section 4 on the main surface 2 of the main chassis 1 along the left and right marginal edges thereof. A shaft 293 is planted on the inside of the left support plate 291 substantially perpendicularly thereto at its backward position and a plate-like support arm 294 is pivoted at one end to the pin 293 while being held in parallel to the support plate 291. Another shaft 295 is similarly planted on the inside of the left support plate 291 substantially perpendicular thereto forwardly and upwardly of the shaft 293 and a plate-like support arm 296 is pivoted at one end to the shaft 295 while being held in parallel to the support plate 291. The other end of the support arm 294 extends forwards and the extension 297 is pivoted by a shaft 299 to a support piece 298 extending from the lower edge of the back of the left side plate 213 of the magazine holder 210. In a similar manner, the other end of the support arm 296 extends forwards and the extension 300 is pivoted by a shaft 301 to the left side plate 213 at the center of its forward portion. On the right support plate 292, support arms 304 and 306 are similarly pivoted at one end thereto by shafts 303 and 305 in such a manner as to be symmetrical to each other with respect to an imaginary plane extending between the left and right support plates 291 and 292 in parallel therewith. The other end of the support arm 304 extends forwards and the extension 307 is pivoted by a shaft 309 to a support piece 308 extending from the right side plate 214 of the magazine holder 210 in the same manner as the extension 297 of the support arm 294 is pivoted by the shaft 299 to the support piece 298 extending from the left side plate 213 of the magazine holder 210. Further, the other end of the support arm 306 extends forwards and the extension 310 is pivoted by a shaft 311 to the right side plate 214.

Further, the magazine holder support mechanism 290 includes a spring mechanism 320. This spring mechanism 320 comprises a pair of resilient wires 321 and 322, each composed of straight line part 323 of substantially the same length as the distance between the support plates 291 and 292, a line part 324 extending from one end of the straight line part 323 substantially perpendicularly thereto and a line part 325 extending from the other end of the straight line part 323 substantially perpendicularly thereto. In this case, the line parts 324 and 325 extending from the both ends of the straight line parts 323 bear such a relation to each other that an imaginary plane including the line parts 323 and 324 and that including the line parts 323 and 325 may cross each other at the position of the line part 323.

The resilient wire 321 is disposed in the following manner. Namely, the end of the line part 323 on the side of the line part 324 is rotatably positioned in a recess 326 which is formed in the upper marginal portion of the support plate 291 in the rear of the shaft 295 pivoting the support arm 296 thereto and a little above the shaft 295. The free end of the line part 324 is retained on a pin 327 planted on the outside of the support plate 291 behind and below the recess 326, and the free end of the line part 325 is retained on a shaft 311 extending between the rotary arm 306 and the right side plate 214 of the magazine holder 210. Accordingly, the resilient wire 321 is interposed between the support plate and consequently the stationary part and the support arm 306 and consequently the magazine holder 210. The other resilient wire 322 is also interposed between the support plate 292 and consequently the stationary part and the support arm 296 and consequently the magazine holder 210 in the following manner. Namely, the end of the line part 323 on the side of the line part 324 is rotatably positioned in a recess 328 formed in the upper marginal portion of the support plate 292 corresponding to the aforesaid recess 326 formed in the support plate 291. The free end of the line part 324 is retained on a pin 329 planted on the outside of the support plate 292 corresponding to the aforesaid pin 327 and the free end of the line part 325 is retained on a shaft 301 extending between the rotative pin 296 and the left side plate 213 of the magazine holder 210. Consequently, the support arms 296 and 306 are biased anticlockwise in FIG. 3 while supporting the magazine holder 210. The support arm 296 has an engaging piece 330 extending outwardly thereof, which is urged against a stopper 331 planted on the inside of the support plate 291 by the biasing force of the resilient wires 321 and 322, and when the support arm 296 is in such a position as to press the engaging piece 330 against the stopper 331 as described above, the magazine holder 210 is held in its magazine housing and unhousing position above the magazine loading section 4 so that the magazine M may be inserted into or removed from the magazine holder 210. Pressing the magazine holder 210 on its top plate 216 downwardly of the above position against the resilient wires 321 and 322, the magazine M housed in the magazine holder 210 is brought down to the position where it is loaded on the magazine loading section 4.

Further, the magazine loading device 3 has a locking mechanism 340 by which the magazine M in the magazine holder 210 brought by the aforesaid magazine holder support mechanism 290 to the magazine loading section 4 is locked in its loaded position.

Figure 5:
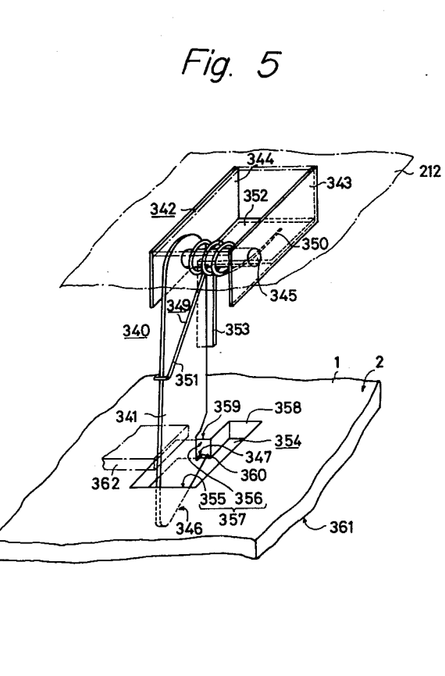
FIG. 5 is a perspective view showing one example of a locking mechanism for use in this invention.

The locking mechanism 340 has a plate-like locking piece 341 which is mounted on the outside of the bottom plate 212 of the magazine holder 210 at the center of its slightly forward portion, as is evident from FIG. 5. The locking piece 341 is pivoted at one end rotatably and swingably on a pin 345 bridged between a pair of opposed front and rear plates 343 and 344 of an angled bracket 342 mounted on the outside of the bottom plate 212 of the magazine holder 210. In this case, the locking piece 341 has an inclined facet 346 formed on the edge of the free end opposite from the free end on the side of the pin 345 to extend in an upper right direction when viewed from the front of the locking piece 341, a facet 347 extending from the upper end of the facet 346 to the left in a horizontal or slightly lower left direction and a facet 348 extending upwardly from the left end of the facet 346. A coiled spring 349 is wound on the pin 345 between the locking piece 341 and the front plate 343 of the angled bracket 342, by which the locking piece 341 is biased rearwardly. Both ends 350 and 351 of the coiled spring 349 are respectively engaged with the bottom plate 352 of the bracket 342 and the facet of the locking piece 341 on the opposite side from the facet 348, so that the locking piece 341 is biased anticlockwise (in FIG. 1) and its biasing force is received by a stopper 353 extending down from the left-hand end of the bottom plate 352 of the bracket 342.

The locking mechanism 340 further includes a locking hole 354 formed in the main chassis 1 at a position corresponding to the locking piece 341 of the magazine holder 210 when the magazine M housed in the magazine holder 210 is brought to the position where it is loaded on the magazine loading section 4. The locking hole 354 is composed of a hole 357 having opposed side walls 355 and 356 into which the free end portion of the locking piece 341 can be loosely inserted, and a hole 358 extending to the right from the front part of the hole 357. When the locking piece 341 is brought down together with the magazine holder 210, the locking piece 341 is lowered with its inclined facet 346 pressed against an edge 359 formed between the main surface 2 of the chassis 1 and the side wall 356 of the hole 357, by which the locking piece 341 is gradually rotated clockwise (in FIG. 1) against the spring 349. After the inclined facet 346 moves out of contact with the edge 359, the top end face 360 between the inclined facet 346 and the facet 347 moves into sliding contact with the side wall 356 of the hole 357. Upon disengagement of the top end face 360 from the side wall 356, the locking piece 341 is rotated anticlockwise to bring its facet 348 into contact with the side wall 356 of the hole 357. In such a state, the facet 347 of the locking piece 341 is engaged with the underside 361 of the chassis 1, so that the locking piece 341 cannot be lifted. Thus, the locking piece 341 is in its locking state.

When the locking piece 341 of the locking mechanism 340 is in its locking state such as described above, the magazine holder 210 having the locking piece 341 assumes its magazine loading position where the magazine M housed in the magazine holder 210 is loaded exactly at the predetermined position in the magazine loading section 4. In such a state that the locking piece 341 is held in its locking position while being subjected to a force pressing it upwardly, by pressing its lower portion from behind (in FIG. 3) by an unlocking lever 362 (generally in dicated by chain lines) against the spring 349, the lower end portion of the locking piece 341 is displaced forward about the position of the shaft 345 and the lower end portion is thereby brought from the hole 357 to the hole 358 to permit the locking piece 341 to rotate anticlockwise (in FIG. 1) until it strikes against the stopper 353. However, the facet 347 remains in the hole 358 in spite of the rotational movement, so that the locking piece 341 is released from its locking condition and can be lifted. Consequently, the magazine holder 210 is automatically brought up by the resiliency of the resilient wires 321 and 322 of the spring mechanism 320 from the magazine loading position to the aforesaid magazine housing and unhousing position.

The magazine loading device 3 further includes a balancing mechanism 370 in association with the aforesaid magazine holder support mechanism 290, by means of which the magazine holder 210 supported by the magazine holder support mechanism 290 is smoothly moved between the aforesaid magazine housing and unhousing position and magazine loading position with its magazine insertion window 220 being held in parallel with the main chassis 1 at all times.

The mechanism 370 has a shaft 371 which is pivoted at both ends to the support plates 291 and 292, extending therebetween substantially perpendicularly thereto and in parallel with the main surface 2 of the chassis 1 in such a manner that it extends below the bottom plate 212 of the magazine holder 210 when the holder 210 is in its magazine loading position. The left and right end portions of the shaft 371 has mounted thereon gears 372 and 373, respectively. Further, plate members 376 and 377, which have racks 374 and 375 respectively extending on imaginary planes of arcs about the shaft 295 and 305 respectively pivoted to the support arms 296 and 306 of the magazine holder support mechanism 290, are formed integrally with the support arms 296 and 305, respectively. The gears 372 and 373 and the racks 374 and 375 are arranged to be meshed with each other in the range of rotation of the support arms 296 and 306, that is, in the range of movement of the magazine holder 210 between its magazine housing and unhousing position and magazine loading position.

Moreover, the magazine loading device 3 has a magazine loading limiting mechanism 380 by means of which it is prevented that the magazine loading section 4 is damaged by the magazine M together with the magazine holder 210 brought down to the magazine loading position in spite of the magazine M being not completely housed in the magazine holder 210.

This mechanism 380 has a support plate 381 which is planted on the main surface 2 of the chassis 1, extending in front of the support plate 291 and 292 in a direction substantially perpendicular thereto. The upper marginal portion of the support plate 381 is bent backwardly substantially at right angles to the plate 381 to provide a bent portion 382, on which shafts 383 and 384 are planted at left- and right-hand positions, respectively. Rotative levers 385 and 386 are pivoted at one end to the shafts 383 and 384, respectively. The other end portions of the rotative levers 385 and 386 have respectively formed therein elongated holes 398 and 399 extending in their lengthwise direction. The elongated holes 398 and 399 have loosely inserted thereinto respectively pins 390 and 391 which are respectively planted at the left and right end portions of a horizontal plate member 387 of a movable plate 389, composed of the horizontal plate member 387 and a plate member 388 extending downwardly from the rear edge of the plate member 387 in a manner to be inclined a little backwardly. A pin 392 is planted on the bent portion of the support plate 381 at the center thereof and a coiled spring 393 is mounted on the pin 392. Both ends of the coiled spring 393 respectively press backwardly pins 396 and 397 planted on the plate member 387 of the movable plate 389 in the vicinity of the shafts 390 and 391, respectively, by which the movable plate 389 is biased rearwardly. The movable plate 389 is adapted such that when the pins 390 and 391 planted thereon are engaged with the elongated holes 398 and 399 on the opposite side from the shafts 383 and 384 respectively, the plate 389 is in its rearmost position and that when pressed forwards against the spring 393, it is retreated forwardly. In this case, however, when the movable plate 389 lies in its rearmost position, if the magazine M is held in its normal position in the magazine holder 210 immediately before it is brought by the magazine holder support mechanism 290 from the magazine housing and unhousing position to the magazine loading position on the magazine loading section 4, the upper half portion of the outer surface of an inclined rear plate 400 of the magazine M moves into sliding contact with or in adjacent relation to the outer surface of the plate member 388 of the movable plate 389, permitting the magazine M to be brought onto the magazine loading section 4. However, if the magazine M projects out forwardly of its normal position in the magazine holder 210, the bottom plate 23 of the magazine M strikes against the plate member 388 of the movable plate 389, preventing the magazine M from being brought onto the magazine loading section 4.

Further, the magazine loading device 3 has a buffer mechanism 410 in association with the above balancing mechanism 370, which ensures to prevent that, in the case where the main surface 2 of the main chassis 1 is held vertical, when the magazine holder 210 supported by the magazine holder support mechanism 290 is returned from the magazine loading position to the magazine housing and unhousing position, the support arms 294, 296, 304 and 306 of the magazine holder support mechanism 290 are rapidly rotated by the addition of the weight of the magazine holder 210 to the force of the aforesaid spring mechanism 320 to cause the engaging piece 330 to violently strike against the stopper 331 of the support plate 291 with an unnecessary large force.

Figure 6:
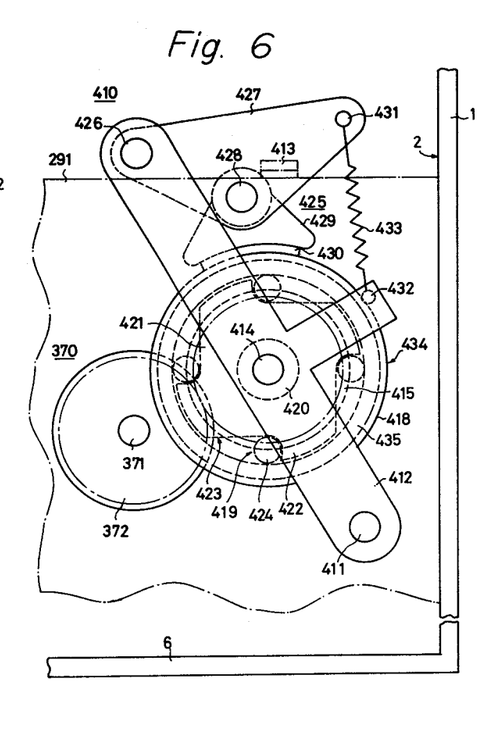
FIG. 6 is a front view illustrating one example of a buffer mechanism for use in this invention.
Figure 7:
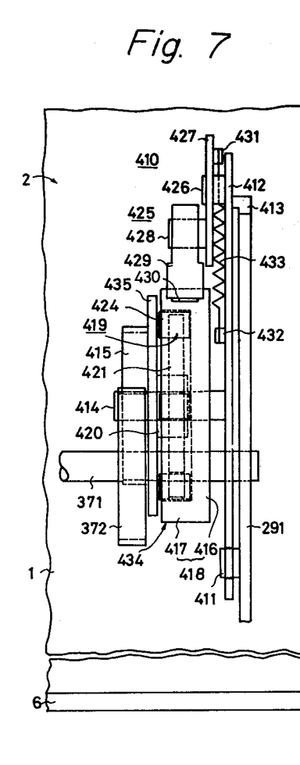
FIG. 7 is a left side view of the buffer mechanism depicted in FIG. 6.

The buffer mechanism 410 has a rotative lever 412 pivotally mounted by a shaft 411 on the inside of the left support plate 291 and the rotative lever 412 is supported by a stopper 413 mounted on the support plate 291 to assume its normal position where it extends up forwardly (in FIG. 3), as is apparent from FIGS. 6 and 7. The rotative lever 412 has mounted thereon a shaft 414 extending perpendicularly to an imaginary plane of rotation of the rotative lever 412. On the shaft 414, there are rotatably mounted a gear 415 and a brake ring 418 composed of a disc 416 and a ring portion 417 extending from the periphery of the disc 416 in a direction perpendicular thereto. The gear 415 and the brake ring 418 are coupled with each other through a unidirection rotary coupling mechanism 419 in such a manner that only when the gear 415 rotates anticlockwise in FIGS. 3 and 6, the brake ring 418 is rotated. The unidirectional rotary coupling mechanism 419 comprises a cylindrical member 420 disposed on the gear 415 on the side of the brake ring 418 with its shaft 414 loosely inserted into the gear 415 and extending inside of the brake ring 418, a ratchet wheel 421 having an outer diameter substantially equal to the inner diameter of the ring portion 417 of the brake ring 418 and mounted on the cylindrical member 420 in such a manner as to be rotatable as a unitary structure with the latter, and columnar rollers 424 each disposed in a recess 423 between adjacent pawls 422 of the ratchet wheel 421. In this case, each of the recesses 423 has such a configuration that, assuming that the gear 415 rotates clockwise in FIGS. 3 and 6, it gradually extends inwardly from the outer periphery of the gear 415 in the anticlockwise direction. The outer diameter of each roller 424 is selected such that when it is in its innermost position of the recess 423, it may freely rotate while making rotary contact with the inner peripheral surface of the ring part 417 of the brake ring 418 or may be adjacent to the inner peripheral surface of the ring portion 417. Consequently, when the gear 415 is rotated anticlockwise in FIGS. 3 and 4, the rollers 424 are brought to their outer position in the recesses 423, so that the brake ring 418 can be rotated together with the gear 415 through the rollers 424. However, when the gear 415 is rotated clockwise, the rollers 424 are moved to their innermost position in the recesses 423, so that the brake ring 418 cannot be rotated through the rollers 424. Reference numeral 435 indicates a ring-shaped plate attached to the gear 415 for preventing the rollers 424 disposed in the recesses 423 of the ratchet wheel 421 from moving out of the recesses 423.

On the other hand, the above brake ring 418 is adapted be braked by a brake shoe mechanism 425. The brake shoe mechanism 425 comprises a rotative arm 427 rotatably mounted by a shaft 426 on the free end of the rotative lever 412 and extending downwardly in FIG. 3, a rotative arm 429 rotatably mounted on the rotative arm 427 by a shaft 428 and a brake shoe 430 mounted on the rotative arm 429. A spring 433 is provided between a pin 431 planted on the free end of the rotative arm 427 extending downwardly in FIG. 3 and a pin 432 planted on an extension of the rotative lever 412 extending downwardly in FIG. 3. As a result of this, the rotative arm 427 is rotated anticlockwise in FIGS. 3 and 6 to urge the brake shoe 430 attached to the rotative arm 429 against the outer peripheral surface of the ring portion 417 of the brake ring 418 serving as a braking surface 434.

Where the main chassis 1 is placed with its main surface 2 horizontal (in the case of FIG. 3), the rotative lever 412 is supported by the stopper 413 due to the weights of the gear 415, the brake ring 418, the unidirectional rotary coupling mechanism 419 and the brake shoe mechanism 425 mounted on the rotative lever 412 and the gear 415 is not meshed with the gear 372 of the aforesaid balancing mechanism 370. Where the main chassis 1 is placed with its main surface 2 vertical, the rotative lever 412 is rotated anticlockwise in FIGS. 3 and 6 due to the weights of the aforementioned parts mounted thereon to bring the gear 415 into meshing engagement with the gear 372 of the balancing mechanism 370.

The foregoing has outlined the construction of one example of this invention. Next, its operation will be described on the assumption that the main chassis 1 is positioned with its main surface 2 horizontal. Let it be assumed that the magazine holder 210 is held at the magazine housing and unhousing position by the magazine holder support mechanism 290 indicated by chain lines in FIG. 3. Such a position of the magazine holder 210 is the position that the magazine M can be housed therein or removed therefrom, and, in this position, the magazine holder 210 takes an attitude that allows ease in inserting the magazine M thereinto and removing it therefrom.

The magazine M is inserted into the magazine holder 210 through its magazine insertion window 220, with the front plate 28 and the bottom plate 23 of the magazine M facing backward and downward respectively. In this case, the pawls 234 and 235 of the rotative lever 230 of the erroneous housing preventive mechanism 230 are positioned in the groove 205 formed in the bottom plate 23 of the magazine M to prevent the rotative lever 230 from rotation, so that insertion of the magazine M into the magazine holder 210 is not prevented. However, if the magazine M is inserted into the magazine holder 210 with its bottom plate 23 upside, the top plate 19 of the magazine M engages the inclined facet *a* of the front pawl 235 of the rotative lever 230 of the erroneous housing preventive mechanism 230, with the result that the magazine M is inserted into the magazine holder 210 while pressing the pawl 235 from above. Consequently, the rotative lever 230 rotates, so that the facet *b* of the rear pawl 234 waits for the front plate 28 of the magazine M to contact therewith. Therefore, the magazine M is not further inserted backwardly from the position where its front plate 28 strikes against the facet *b* of the pawl 234. Thus, even if the magazine M is inserted upside down into the magazine holder 210, it is effectively prevented.

In the case where the magazine M is correctly contained in the magazine holder 210 placed in its magazine housing and unhousing position the front plate 28 of the magazine M makes contact with the inner surface of the rear plate 218 of the magazine holder 210 and the top plate 19 of the magazine M is pressed down by the resilient force of the resilient rings 241 and 242 of the magazine pressing mechanism 240. In this case, the resilient rings 241 and 242 are flat as compared with the case where the magazine M is not contained in the magazine holder 210, as is evident from FIG. 3. The front and rear ends of the resilient rings 241 and 242 are pressed against the limiting plates 247, 248 and 257, 258, respectively, by which the forces of the resilient rings 241 and 242 pressing the magazine M are promoted. Before the magazine M is contained in the magazine holder 210, the resilient rings 241 and 242 sag but it is prevented by the columnar members 251, 252 and 261, 262, so that the magazine M can be smoothly inserted into the magazine holder 210. Further, when the magazine M is inserted into the magazine holder 210, a certain amount of force is required therefore because of friction between the magazine M and the resilient rings 241 and 242, so that accidental insertion of the magazine M into the magazine holder 210 can be avoided.

In the case where the magazine M is correctly contained in the magazine holder 210 at its magazine housing and unhousing position, the engaging members 272 mounted on the rotative levers 272 and 274 of the reel pressing mechanism 270 assume such positions that they do not engage the support arms 296 and 306 of the magazine holder support mechanism 290. Accordingly, the reel pressing members 271 of the reel pressing mechanism 270 do not press the reels 17 and 18 housed in the magazine M.

Thus, after the magazine M is correctly housed in the magazine holder 210 at the magazine housing and unhousing position by pressing down the top plate 216 of the magazine holder 210, the magazine M contained in the magazine holder 210 is loaded on the magazine loading section 4. Namely, when the top plate 216 of the magazine holder 210 is pressed down, the support arms 294, 296 and 304, 306 are rotated with their free ends approaching the main surface 2 of the main chassis 1; the magazine holder 210 is lowered towards the main chassis 1 together with the magazine M; the lower end portion of the locking piece 241 secured to the bottom plate 212 of the magazine holder 210 to constitute the locking mechanism 340 is inserted into the hole 357 with the inclined facet 346 being urged by the force of the spring 349 against the edge 359 formed by the side wall of the hole 357 of the locking hole 354 formed in the main chassis 1 and the main surface 2 of the main chassis 1; and finally the facet 348 of the locking piece 341 is brought into contact with the side wall 356 of the hole 357. Therefore, upon releasing the pressure to the magazine holder 210 after the above condition is obtained, the facet 347 of the locking piece 341 gets in contact with the underside of the main chassis 1, by which upward movement of the magazine holder 210 by the force of the resilient wires 321 and 322 of the spring mechanism 320 is prevented. Thus, the magazine holder 210 is locked in position by the locking mechanism 340. In this case, a tensional force is applied to the resilient wires 321 and 322 of the spring mechanism 320.

In the manner described above, the magazine holder 210 is lowered from the magazine housing and unhousing position and locked by the locking mechanism 340, during which the magazine holder 210 is held substantially parallel to the main surface 2 of the main chassis 1 and, while the magazine holder 210 is brought down to its locked position from a position immediately above it, the bottom plate 212 of the magazine holder 210 is held substantially parallel to the main surface 2 of the main chassis 1. Further, while the magazine holder 210 is brought down from the magazine housing and unhousing position to the locked position, the balancing mechanism 370 associated with the magazine holder support mechanism 290 ensures to prevent that the magazine holder 210 is not parallel with the main chassis 1. Namely, the racks 374 and 375 of the support arms 296 and 306 of the magazine holder support mechanism 290 mesh with the gears 372 and 373 of the shaft 371 bridged between the support plates 291 and 292 to rotate the gears 372 and 373 in response to the support arms 296 and 306. If the magazine holder 210 is brought down while being inclined, for example, to the left by some cause, the gear 372 is going to rotate more than the gear 373 correspondingly. In this case, however, since the gears 372 and 373 are coupled with each other through the shaft 371 common to them, the amount of rotation of the gear 373 becomes equal to that of the gear 372. Consequently, the inclination of the magazine holder 210 to the left is compensated for the magazine holder 210 is brought down in parallel with the main chassis 1.

Further, the magazine holder 210 containing the magazine M is brought down from the magazine housing and unhousing position to the locked position only when the magazine M is correctly housed in its predetermined position in the magazine holder 210, that is, except when the magazine M is housed in the magazine holder 210 projecting out forwardly thereof. If the magazine M is housed in the magazine holder 210 projecting out forwardly thereof, the magazine holder 210 is prevented by the action of the magazine loading limiting mechanism 380 from being lowered from the magazine housing and unhousing position to the locked position. This is because the bottom plate 23 of the magazine M collides with the horizontal plate portion 387 of the magazine loading limiting mechanism 380. However, when the magazine M is correctly housed in the magazine holder 210, the bottom plate 23 of the magazine holder M does not collide with the horizontal plate portion 387 of the magazine loading limiting mechanism 380, so that the magazine holder 210 is permitted to pass the position of the limiting mechanism 380. Further, in this case, if the magazine M projects out a little forwardly from the magazine holder 210 though held in the predetermined range of position in the magazine holder 210, since the plate member 388 of the magazine loading limiting mechanism 380 is biased rearwardly by the spring 393, this plate member 388 presses the rear plate 400 of the magazine M backwardly, so that the magazine M is caused to correctly assume its predetermined position in the magazine holder 210.

In the condition that the magazine holder 210 containing the magazine M has been brought down from the magazine housing and unhousing position to the position where it is locked by the locking mechanism 340, as described above, the magazine supports 43 to 46 of the magazine loading section 4 make contact with the bottom plate 23 of the magazine M through the hole 211 of the magazine holder 210. Similarly, the magazine positioning pins 47 and 48 of the reel supports 41 and 42 are inserted into the reel support insertion holes 33 and 32 of the reels 18 and 17 in the magazine M and the magazine positioning holes 35 and 34 of the bottom plate 23 of the magazine M through the hole 211 of the magazine holder 210. Further, the tape drawing-out and guide pin 106 and the pinch roller 98 of the tape threading means 81 are positioned in the space 39 of the magazine M through the recess 220 of the bottom plate 212 of the magazine holder 210 and the recess 36 of the bottom plate 23 of the magazine M. Consequently, the position where the magazine holder 210 is locked by the locking mechanism 340 is the position where the magazine M is loaded on the magazine loading section 4.

The position of the magazine M relative to the magazine loading section 4 at such a magazine loading position is a correct, predetermined position which is defined by positioning the magazine M in the magazine holder 210 by the magazine pressing mechanism 240 as described above, by bringing the magazine holder 210 by the balancing mechanism 370 on the magazine loading section 4 while holding it in parallel with the main chassis 1 as described above, and by bringing the magazine holder 210 past the position of the magazine loading limiting mechanism 380 onto the magazine loading section 4 as described above.

Further, at the position where the magazine M is loaded on the magazine loading section 4, the rotative levers 273 and 274 of the reel pressing mechanism 270 rotate against the springs 288 and 289 while engaging the engaging members 272 each mounted on one end of each of the levers with the upper surfaces of the support arms 296 and 306 of the magazine holder mechanism 290. The reel pressing members 271 mounted on the other ends of the rotary levers 273 and 274 press, by the force of the spring 285, the engaging surfaces 202 of the bearings 21 and 22 projecting out upwardly from the upper surfaces of the top plate 19 of the magazine M. Consequently, the reels 18 and 17 are urged downwardly by the spring 285 through the bearings 21 and 22 and the shafts 13, with the lower flanges 16 spaced away from the bottom plate 23 of the magazine M because the reel supports 41 and 42 of the magazine loading section 4 are inserted into the reel support insertion holes 33 and 32, respectively, by which the reel supports 41 and 42 are correctly and snugly inserted into the reel support receiving holes 12 of the reels 18 and 17, respectively. Thus, the reels 18 and 17 and the reel supports 41 and 42 are positively coupled with each other during rotation.

After the magazine M is thus loaded correctly at its predetermined position on the magazine loading section, the tape threading means 81 is actuated to rotate the rotary ring 93 as mentioned previously. The magnetic tape 27 in the magazine M is drawn out by the tape drawing-out and guide pin 106 of the tape threading means 81 through the tape drawing-out windows 29 of the magazine M and the magazine holder 210 in a backward left direction and then the magnetic tape 27 is directed across the tape guide surface 67 of the rotary magnetic head assembly 60 and the pinch roller 98 is brought into rotary contact with the capstan 131 of the magnetic tape drive means 80 with the magnetic tape 27 being gripped therebetween. Thus, the magnetic tape 27 is directed on the tape guide surface 67 of the rotary magnetic head assembly 60 while being guided by the first and second position defining means 70 and 80, the tension arm 144, the pins 117 of the tape guide mechanisms 111-1 to 111-3, etc. In such a condition, by supplying video signals to the rotary magnetic head assembly 60 while transporting the magnetic tape 27 by driving the capstan 131 of the tape drive means 80 and the reel shaft 38 of the magazine loading device 4, the video signals are recorded on the magnetic tape 27 in the form of skew magnetic tracks extending across the tape or reproduced therefrom.

After recording of the video signal on the magnetic tape 27 or reproducing of the recorded signal therefrom, by actuating the tape threading means 81 to rotate the rotary ring 93 in the direction opposite to that in the above and driving the reel shaft 38, the magnetic tape 27 is entirely brought back into the magazine M, providing the same state as that when the magazine M was loaded on the magazine loading section 4 before recording or reproducing.

In the same condition as that when the magazine M was loaded before recording or reproducing, by pushing forwards the free end of the locking piece 341 of the locking mechanism 340 by the releasing lever 362 against the spring 349, the free end of the locking piece 341 is guided into the hole 358 of the locking hole 354 formed in the main chassis 1, by which the magazine holder 210 is released from its locked condition, so that the magazine holder 210 is returned by the force of the resilient wires 321 and 322 of the spring mechanism 320 to the aforesaid magazine housing and unhousing position. In this case, the magazine holder 210 restores the parallel relation to the main chassis 1 by the action of the balancing mechanism 370 as in the case where the magazine holder 210 is brought down from the magazine housing and unhousing position to the magazine loading position. The restoring force, in this case, is the force that the resilient wires 321 and 322 of the spring mechanism 320, each composed of the line part 323 extending over a length larger than that of the magazine holer 210 in its longitudinal direction and the relatively long line parts 324 and 325 extending from the both ends of the line part 323 and having the end portions of the line part 323 disposed in the recess 326 and 367 respectively formed in the support plates 291 and 292, restore torsion applied to the resilient wires 321 and 322 when the magazine holder 210 is brought down from the magazine housing and unhousing position to the magazine loading position. Accordingly, the above restoring force is very great.

The above has described the operation in the case where the main chassis 1 is placed with its main surface 2 horizontal and, in this case, the buffer mechanism 410 is substantially inoperative. The reason therefor is that the rotative lever 412 is held in the rotatational position where it is engaged with the stopper 413 due to the operation of the rotative lever 412 and due to the weight of the gear 415 mounted on the rotative lever 412, the brake ring 418 and the unidirectional rotary coupling mechanism 419 to hold the gear 415 out of engagement with the gear 372 of the balancing mechanism 370, as is apparent from FIG. 3.

Where the main chassis 1 is placed with its main surface 2 vertical, that is, where the rear plate 6 rests on a suitable horizontal stand, the magazine holder 210 assumes the magazine housing and unhousing position and is brought therefrom to the magazine loading position is exactly the same manner as in the case where the main surface 2 is horizontal. In this case, however, the rotative lever 412 of the buffer mechanism 410 assumes the rotational position where its gear 415 meshes with the gear 372 of the balancing mechanism 370 due to the operation of the rotative lever 412 and due to the weight of the gear 415 mounted thereon, the brake ring 418 and the unidirectional rotary coupling mechanism 419. Accordingly, while the magazine holder 210 is brought from the magazine housing and unhousing position to the magazine loading position, the support arms 296 and 306 of the magazine holder support mechanism 290 rotate, by which the gears 372 and 373 of the balancing mechanism 370 are rotated through the racks 374 and 375 of the support arms 296 and 306, thus rotating the gear 415 of the buffer mechanism 410. However, the gear 415 rotates but the brake ring 418 is not rotated by the action of the unidirectional rotary coupling mechanism 419. Therefore, even if the shoe 430 of the brake show mechanism 425 is pressed against the brake ring 418 by the force of the spring 433, substantially no braking force is applied to the gear 415. Thus, the balancing mechanism 370 and the magazine holder support mechanism 290 perform substantially the same operations as those in the case where the main surface 2 is horizontal.

However, while the magazine holder 210 is returned from the magazine loading position to the magazine housing and unhousing position by the force of the resilient wires 321 and 322 of the spring mechanism 320, the support arms 296 and 306 of the magazine holder support mechanism 290 rotate, by which the gears 372 and 373 of the balancing mechanism 370 are rotated through the racks 374 and 375 of the support arms 296 and 306 in the direction reverse to that in the case where the magazine holder 210 is brought from the magazine housing and unhousing position to the magazine loading position. As a result of this, the brake ring 418 is rotated by the rotation of the gear 415 through the unidirectional rotary coupling mechanism 419. By the way, the shoe 430 of the brake shoe mechanism 425 is urged against the brake ring 418 by the force of the spring 433. Consequently, the rotation of the support arms 296 and 306 of the magazine holder support mechanism 290 is braked by the rotation of the gear 415, and accordingly through the gears 372 and 373 of the balancing mechanism 370. The application of the braking force to the rotation of the support arms 296 and 306 of the magazine holder support mechanism 290 by the buffer mechanism 410 ensures to eliminate the possibility that when the support arms 296 and 306 of the magazine holder support mechanism 290 is rotated a little by the force of the resilient wires 321 and 322 of the spring mechanism 320 to bring the magazine holder 210 from the magazine loading position to the magazine housing and unhousing position, the support arms 296 and 306 are rapidly rotated by the addition of the force of the resilient wires 321 and 322 of the spring mechanism 320 with the weights of the support arms 296 and 306 and the weights of the magazine holder 210 supported thereby to cause the engaging member 330 of the support arm 296 to violently strike against the stopper 331 of the support plate 291 to jolt or bring down the apparatus. Accordingly, the magazine holder 210 is quietly and smoothly returned from the magazine loading position to the magazine housing and unhousing position.

It will be apparent that many modifications and variations may be effected without departing from the scope of the novel concepts of this invention.

We claim as our invention:

1. A magnetic video recording and reproducing apparatus comprising a magazine loading section disposed on the main surface of a main chassis of said apparatus, a rotary magnetic head assembly composed of a cylindrical magnetic tape guide surface and a rotary magnetic head and disposed on the main surface of the main chassis, a magazine loading device for loading a magazine formed with a casing containing a magnetic tape onto said magazine loading section and unloading said magazine therefrom, and magnetic tape threading means for drawing out said magnetic tape from said magazine to thread it on the magnetic tape guide surface of said rotary magnetic head assembly, in which said magazine loading device is composed of at least a magazine holder for housing the magazine inserted thereinto from the front of said magazine holder, a magazine holder support mechanism for supporting said magazine holder and bringing it from a magazine housing and unhousing position where the magazine is inserted into and removed from the magazine holder to a magazine loading position where the magazine is loaded on said magazine loading section and bringing the magazine holder from said magazine loading position to said magazine housing and unhousing position, and a buffer mechanism for providing a buffer effect when the magazine holder is brought from the magazine housing and unhousing position to the magazine loading position in the case of the main chassis being positioned vertical; said magazine holder support mechanism has left and right support plates planted on the main surface of the main chassis and first and second support arms pivoted to each of said left and right support plates, the free ends of said first support arms respectively pivoted to the left and right support plates being pivoted to the forward portions of said left and right side plates of the magazine holder on the outside thereof and the free ends of said second support arms pivoted to the left and right support plates being pivoted to the backward portions of the magazine holder on the outside thereof; and said buffer mechanism comprises a rotative lever pivotally mounted on the main chassis, a rotary member disposed to rotate with the rotation of the first support arm of said magazine holder support mechanism in the case of the main chassis being positioned with its main surface vertical, a brake ring mounted on the shaft of said rotative lever in a manner to be rotated through said rotary member and a uni-directional rotary coupling mecanism only when said first support arm rotates for bringing the magazine holder from the magazine loading position to the magazine housing and unhousing position, and a brake shoe mechanism for said brake ring.

2. A magnetic video recording and reproducing apparatus comprising:
   a magazine loading section disposed on a chassis of said apparatus;
   a rotary magnetic head assembly composed of a cylindrical magnetic tape guide surface and a rotary magnetic head and disposed on the chassis;
   a magazine loading device for loading a magazine formed with a casing containing a magnetic tape onto said magazine loading section and unloading said magazine therefrom; and
   magnetic tape threading means for drawing out said magnetic tape from said magazine to thread it on the magnetic tape guide surface of said rotary magnetic head assembly;
   said magazine loading device being composed of at least a magazine holder for housing the magazine inserted thereinto and a magazine holder support mechanism for supporting said magazine holder and brining it from a magazine housing and unhousing position where the magazine is inserted into and removed from the magazine holder to a magazine loading position where the magazine is loaded on said magazine loading section and bringing back the magazine holder from said magazine loading position to said magazine housing and unhousing position;
   characterized in that said magazine holder further includes a buffer mechanism, said buffer mechanism being composed of a detect mechanism for detecting whether said chassis is placed in such a state that the direction in which said magazine holder support mechanism brings said magazine holder from said magazine loading position towards said magazine housing and unhousing position is vertical or in such a state that said direction is horizontal, a brake mechanism for providing a buffer effect on the operation of bringing said magazine holder by said magazine holder support mechanism from said magazine loading position towards said magazine housing and unhousing position, and a buffer effect switching mechanism for controlling said brake mechanism to provide said buffer effect or not to provide it on the operation of bringing said magazine holder by said magazine holder support mechanism from said magazine loading position towards said magazine housing and unhousing position;
   in which when it is detected by said detect mechanism that said chassis is placed so that the direction of said magazine holder being brought by said magazine holder support mechanism from said magazine loading position towards said magazine housing and unhousing position is said horizontal direction, said detect mechanism controls said brake mechanism to provide said buffer effect on the operation of bringing said magazine holder by said magazine holder support mechanism from said magazine loading position towards said magazine housing and unhousing position, and when it is detected by said detect mechanism that said chassis is placed so that the direction of said magazine holder being brought by said magazine holder support mechanism from said magazine loading position towards said magazine housing and unhousing position is said vertical direction, said detect mechanism controls said brake mechanism not to provide said buffer effect on the operation of bringing said magazine holder by said magazine holder support mechanism from said magazine loading position towards said magazine housing and unhousing position.

3. A magnetic video recording and reproducing apparatus according to claim 2, wherein said detect mechanism has a rotative lever pivoted at one end and is adapted to detect it from the direction of rotation of said rotative lever whether the direction of bringing said magazine holder by said magazine holder support mechanism from said magazine loading position towards said magazine housing and unhousing position is said horizontal direction or said vertical one.

4. A magnetic video recording and reproducing apparatus according to claim 2, wherein said brake mechanism has a brake ring driven by the operation of bringing said magazine holder by said magazine holder support mechanism from said magazine loading position towards said magazine housing and unhousing position when it is detected by said detect mechanism that said chassis is placed so that the direction of bringing said magazine holder from said magazine loading position towards said magazine housing and unhousing position is said horizontal direction, and a brake shoe for braking said ring.

* * * * *